(12) United States Patent
Wang et al.

(10) Patent No.: US 8,102,759 B2
(45) Date of Patent: Jan. 24, 2012

(54) SENSOR NETWORK

(75) Inventors: Gang Wang, Shanghai (CN); Sheng Jin, Shanghai (CN); Ningjiang Chen, Shanghai (CN); Qinfeng Zhang, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 385 days.

(21) Appl. No.: 11/720,779

(22) PCT Filed: Nov. 30, 2005

(86) PCT No.: PCT/IB2005/053961
§ 371 (c)(1),
(2), (4) Date: Oct. 28, 2009

(87) PCT Pub. No.: WO2006/061735
PCT Pub. Date: Jun. 15, 2006

(65) Prior Publication Data
US 2010/0039940 A1    Feb. 18, 2010

(30) Foreign Application Priority Data
Dec. 7, 2004  (CN) .......................... 2004 1 0100113

(51) Int. Cl.
*G01R 31/08* (2006.01)
(52) U.S. Cl. ....................... 370/216; 370/242
(58) Field of Classification Search .................. 370/242, 370/254, 338
See application file for complete search history.

(56) References Cited

U.S. PATENT DOCUMENTS

| 6,665,520 | B2 | 12/2003 | Romans |
| 7,356,548 | B1* | 4/2008 | Culp et al. ............................. 1/1 |
| 7,636,038 | B1* | 12/2009 | Nof et al. ...................... 340/506 |
| 2003/0063585 | A1 | 4/2003 | Younis et al. |
| 2005/0200480 | A1* | 9/2005 | Caras et al. .............. 340/539.22 |
| 2006/0062154 | A1* | 3/2006 | Choy et al. .................... 370/242 |

FOREIGN PATENT DOCUMENTS
WO    WO2006032678 A1    3/2006

OTHER PUBLICATIONS

Gold et al: "Use of Context-Awareness in Mobile Peer-to-Peer Networks"; Proceedings of the Eighth Workshop on Future Trends of Distributed Computing Systems, Oct. 31, 2001, pp. 142-147, XP001086511.
Safwat et al: "Power-Aware Fair Infrastructure Formation for Wireless Mobile AD HOC Communications"; 2001 IEEE Global Telecommunications Conference, San Antonio, TX, Nov. 25-29,, IEEE, vol. 5 of 6, Nov. 25, 2001, pp. 2832-2836, XP010747569.

(Continued)

*Primary Examiner* — Derrick Ferris
*Assistant Examiner* — Matthew Hopkins

(57) ABSTRACT

The present invention provides a method for finding a backup node for a node in a sensor network. Firstly, determining a node which is in a state of waiting for being an agent node among a plurality of nodes adjacent to the node to be backed up for using the agent node to find the backup node. The states of waiting for being backed up is that the quantity of electricity of the node to be backed up drops below a preset value. According to the present invention, the node to be backed up does not need to communicate with a large number of nodes. It only needs to determine an agent node among the adjacent notes to do the substantial search for a backup node.

11 Claims, 3 Drawing Sheets

OTHER PUBLICATIONS

Tai et al: "Cluster-Based Failure Detection Service for Large-Scale AD HOC Wireless Network Applications"; Proceedings of the 2004 International Conference on Dependable Systems and Networks in Florence, Italy Jun. 28-Jul. 1, 2004; IEEE, Jun. 28, 2004, pp. 749-758, P010710878.

Younis et al: "Energy-Aware Routing in Cluster-Based Sensor Networks"; Proceedings of the 10th IEEE Intl. Symposium on Modeling, Asalysis & Simulation of Computer & Telecommunications Systems, IEEE 2002.

Pottie, G.: "Wireless Sensor Networks"; ITW 1998, Killarney, Ireland, Jun. 22-26, IEEE 1998, pp. 139-140.

Ye et al: "Peas: A Robust Energy Conserving Protocol for Long-Lived Sensor Networks"; Proceedings of the 10th IEEE Intl. Conference on Network Protocols, IEEE 2002.

* cited by examiner

SENSOR NETWORK

BACKGROUND OF THE INVENTION

This invention relates to a data network, particularly to a sensor network capable of reasonably managing energy consumption.

The possible application environments of sensor networks are very extensive, such as physiological monitoring, environmental monitoring (air, water, soil, etc.), condition-triggered maintenance, intelligent space, military uses, stock management, and other work unsuitable for human beings to do.

A sensor network generally comprises a set or sets of sensors (also referred to as nodes in a sensor network) connected by wire or wireless means for jointly or separately doing specific work. Each sensor of the sensor network normally has one or more of the following functions: inducing, storing, transmitting, relaying, accepting query, triggering events, and processing data, etc.

Since sensors of the sensor network are small, inexpensive, easy to be disposed and increasingly strong in function, the sensor network becomes more and more popular. But, with these special characteristics mentioned above, the energy use and storage of sensors have increasingly become an important problem. How to maximize the working time of sensors without affecting the efficiency of sensors and sensor networks has become a topic of heated discussion.

The US patent application (Pub. No. US 2003/0063585A1; applicant: the US Honeywell Inc.; and inventor Mohamed F. Younis) has disclosed a method for managing energy consumption of sensor network. Firstly, dividing the sensors of the sensor network into plurality of groups according to a specific rule, and each group has a sensor acting as a gateway for transmitting data of each sensor to a control node. Then, setting up a route table for each group in a corresponding gateway, and setting up a relatively smaller rout table at each sensor node, so as to consume minimum energy. After that, monitoring the available energy of each sensor. Finally, re-setting up the route table according to the variation of the available energy of each sensor.

The US patent application has reduced, to a certain extent, energy consumption of each group of sensors. However, each group of sensors has a sensor used as a gateway for coordinating the work of all the sensors in the group, if the gateway is damaged (it is quite possible for it to be damaged under some adverse circumstances), it would greatly affect the efficiency of the group and even the entire sensor network. Further, since the gateway serves as the core of the entire group of sensors, all the sensors need to communicate with the gateway to finish the work, which would inevitably increase the quantity of communication within the group, and, thus, increase the energy consumption of the group, particularly increase the energy consumption of some relay nodes.

Therefore, both a new sensor network and a new method for managing energy consumption in a sensor network are needed, so as to make it possible for the sensor network to maximize the life of sensors without affecting the efficiency of the sensors and the sensor network.

OBJECT AND SUMMERY OF THE INVENTION

One of the objects of the present invention is to maximize the life of sensors without affecting the efficiency of the sensors and the sensor network, to provide a new sensor, a new sensor network, and a new method for managing energy consumption in a sensor network.

The present invention has provided a method for finding a backup node for a node within a sensor network. Firstly, determining that the node is in a state to be backed up. Then, determining an agent node among a plurality of nodes adjacent to the node to be backed up, so that the agent node seeks the backup node on behalf of the node to be backed up. Furthermore, the data of the node to be backed up can be transmitted to the backup node.

One embodiment of the present invention shows that the state to be backed up is that the quantity of electricity of the node to be backed up decreases below a pre-set value, and, then, the node to be backed up itself does not need to communicate with a lot of nodes in order to find for itself a backup node. It needs only to determine an agent node, among the adjacent nodes, to pursue the substantial search of the backup node. Since the agent node is in the vicinity of the node, the determining process will not consume too much energy of the node. Meanwhile, since the node to be backed up does not pursue the substantial search, it further saves energy. Besides, since the finally found backup node is normally somewhere around the node, it would reduce energy consumption for the agent node in the vicinity of the node to be backed up.

The present invention also provides a sensor is one of a plurality of nodes of a sensor network, and it comprises a detecting means for detecting whether the sensor is waiting to be backed up, and a determining means for determining, when the sensor is to be backed up, an agent node among a plurality of nodes adjacent to the node, so that the agent node seeks the backup node on behalf of the node to be backed up.

The present invention provides, in addition, a sensor network, and the sensor network comprises a plurality of sensor nodes including a first sensor and a second sensor. The first sensor includes a detecting means for detecting whether the sensor is to be backed up, and a determining means for determining, when the sensor is waiting to be backed up, an agent node among a plurality of nodes adjacent to the node, and requesting the second sensor to find a backup node for it; the second sensor includes a communication means for finding a backup node for the first sensor at the request from the first sensor.

The other objects and achievements of the present invention will be made more evident and the present invention be more comprehensively understandable by the following description and claims with reference to the appended drawings.

BRIEF DESCRIPTION OF THE DRAWINGS

The present invention is explained in detail by way of embodiments and with reference to the drawings, which comprises.

The same reference numbers in the figures indicate the similar or identical features and functions.

DETAILED DESCRIPTION OF THE INVENTION

Figure 1:
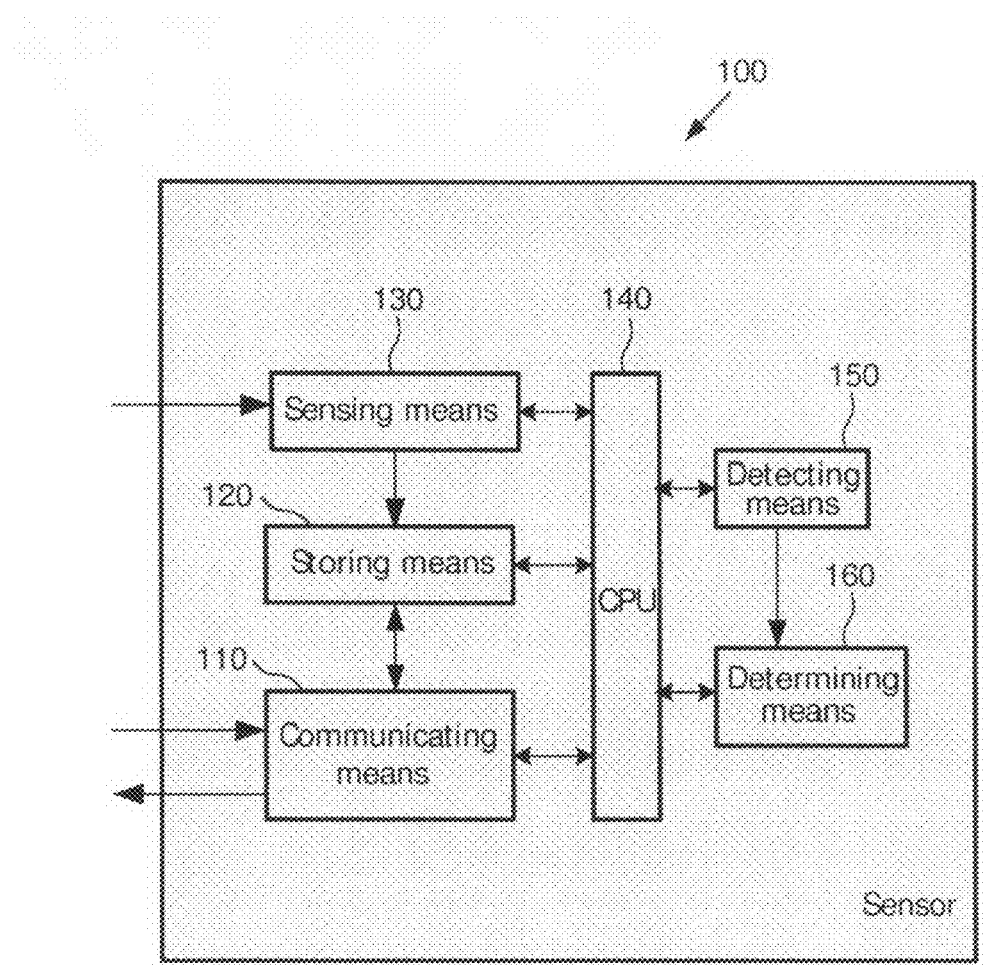
FIG. 1 is a schematic block view of the components of a sensor according to one embodiment of the present invention.

FIG. 1 is a schematic block view of the components of a sensor according to one embodiment of the present invention. Means 100 includes a communication means 110, a sensor means 130, a detecting means 150, a determining means 160, and a power supply (not shown in the Fig.). The power supply provides energy needed for the sensor to do its work. It is non-rechargeable or rechargeable.

Means 100 also includes a storing means 120 and a CPU 140.

Means 100 can be a node of a sensor network, in which the functions of some means (e.g. detecting means 150 and determining means 160) can be performed through software. As far as those skilled in the art, the means included in means 100 can be realized by a plurality of conventional means as long as their combination can perform the function of the present invention.

Sensor means 130 is used for inducing the surrounding environment. For example, a particular change in the surrounding environment will trigger a particular function of the sensor. The induced message can be transmitted through communicating means 110 for processing, and also can processed, to an extent, by CPU 140, and then stored in the storing means 120; and, of course, it is also directly stored in the storing means 120.

Communicating means 110 is used for transmitting environmental message induced by the sensor, such as message induced by sensor means 130; also for transmitting message stored in storing means 120, which may be relayed from other sensors; the a means is also used for receiving other message received from other sensors, such as an inquiry request.

Storing means 120 is used for storing message, which may be the environment message induced by the sensor means 130 or message which communicating means 110 receives from other sensors.

Detecting means 150 is used for detecting whether the sensor is in a state of waiting for being backed up, a state which can be pre-set by a sensor manufacturer or a sensor network system manufacturer. For example, storing means 120 of the sensor has been 80% full, or the quantity of electricity of the sensor has dropped below a pre-set value.

Determining means 160 is used for determining, when the sensor is a state of waiting for being backed up, an agent node among a plurality of nodes adjacent to the node, so that the agent node seeks the backup node on behalf of the node to be backed up.

CPU 140 is used for coordinating the work of the other components (e.g. detecting means 150 and determining means 160) of the sensor according to the pre-stored commands of the sensor. Of course, the CPU can also process some more complex data if necessary.

Figure 2:
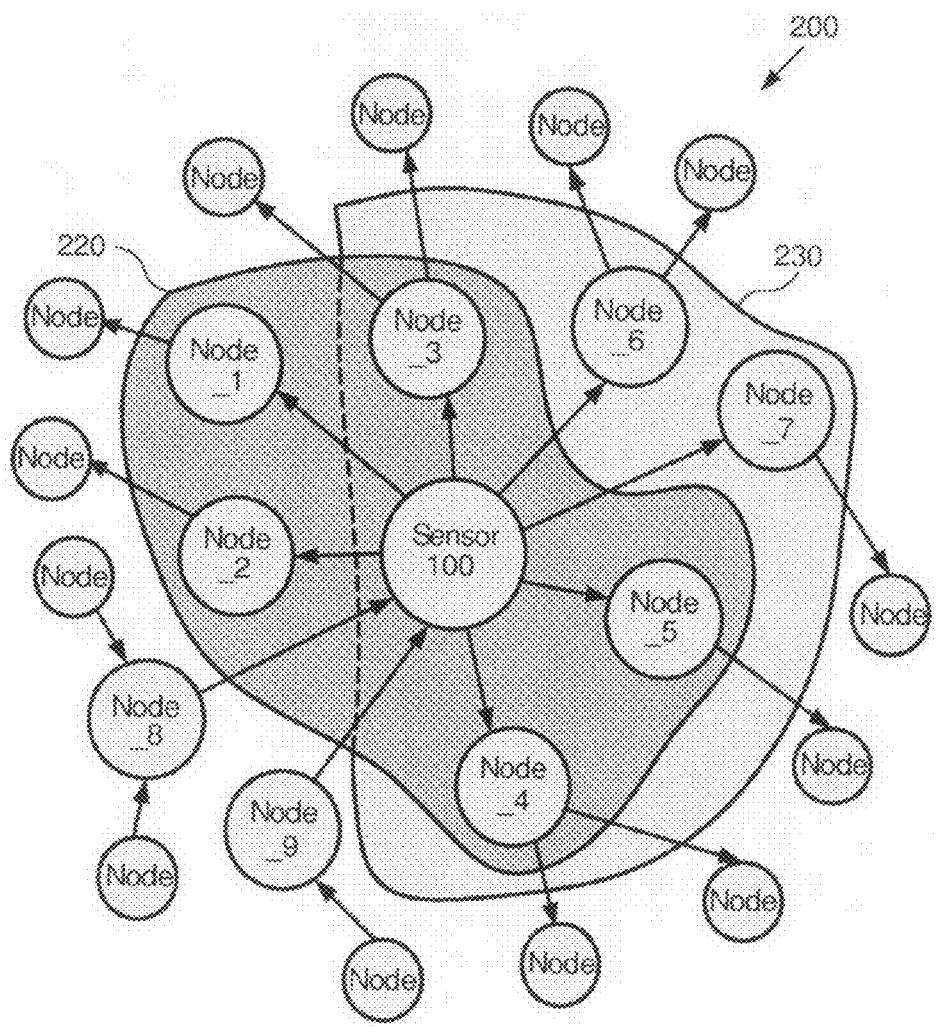
FIG. 2 is a schematic view of the system of a sensor network according to one embodiment of the present invention.
Figure 3:
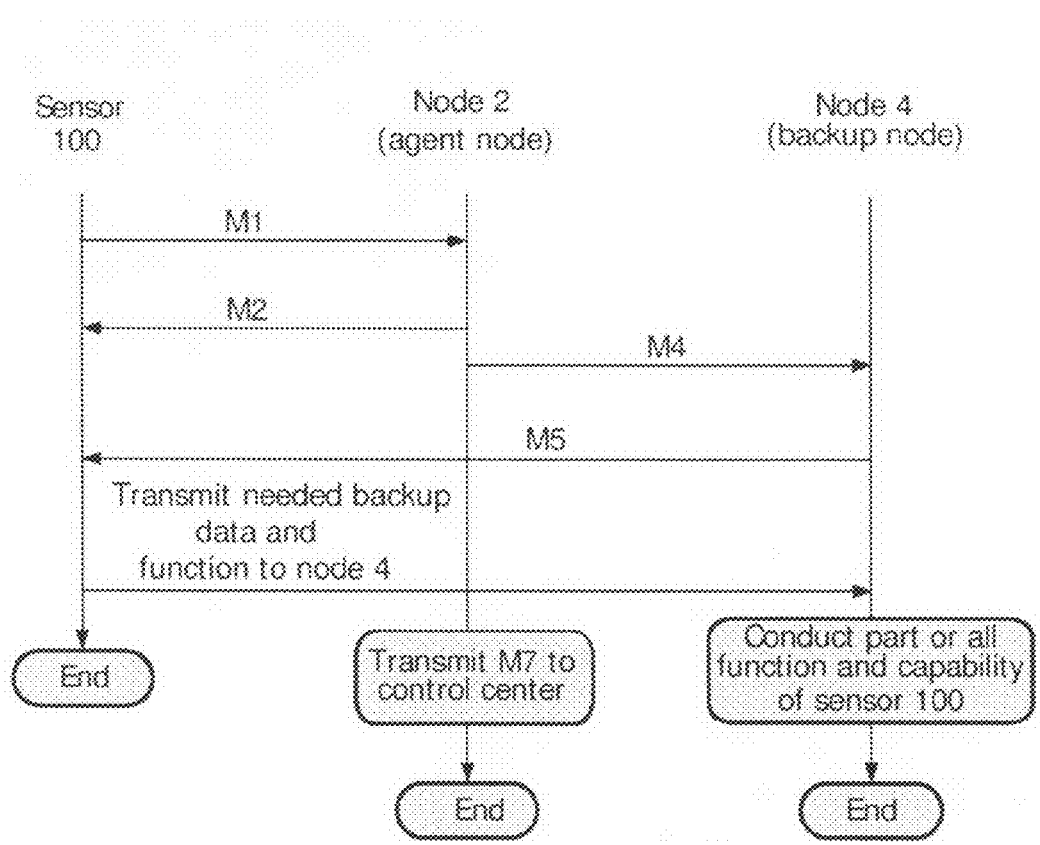
FIG. 3 is a flow chart of communication of a sensor network according to one embodiment of the present invention.

FIG. 2 is a schematic view of the system of a sensor network according to one embodiment of the present invention, and FIG. 3 is a flow chart of communication of a sensor network according to one embodiment of the present invention. The sensor network comprises a plurality of sensors, including sensor 100, in which nodes 1-9 can communicate (one-hop) with sensor 100, while multi-hop communication is needed for the other nodes to communicate with sensor 100. Each sensor in the sensor network has one or more of the following functions: inducing, storing, transmitting, replaying, accepting request, event triggering, and data processing, etc.

According to FIGS. 2 and 3, when sensor 100 detects that it itself is a state of waiting for being backed up, say its quantity of electricity drops to a pre-set value (TH1, for example 25% of its total electricity quantity storage capacity), sensor 100 has found an agent node (AN) among the nodes adjacent to it, it transmits to the agent node a request (M1), requesting it to communicate with the available nodes (ALAN) for finding a backup node (BN) for the sensor 100.

The adjacent nodes (NN) may include all nodes that can directly communicate (i.e. one-hop) with sensor 100. To reduce communication performed for finding the agent node, the agent node may be one of the adjacent nodes that have performed one-hop communication most recently with the sensor 100. Of course, if sensors are relatively densely distributed within an area, the adjacent nodes may include one that can carry on multi-hop communication with the sensor 100.

Request M1 sent by the sensor 100 may be in the format as follows:

| Message type | sender | Receiver | Content | | |
|---|---|---|---|---|---|
| M 1 | Sensor 100 | RN | Function | ALAN | Capability |

The "function" in the message M1 is used for indicating the functions of sensor 100, e.g. temperature inducing, sound inducing and brightness inducing, storing function, etc., and data processing function, etc.

The "capability" in message M1 is used for indicating the capabilities and states of the various levels of the functions of sensor 100, e.g. the capability of inducing key data, the capability of inducing general data, the quantity of the various data stored in the storage, etc. The key data include those nodes which change relatively rapidly, and are more important to decision making.

"ALAN" in Message M1 serves as a list of the available backup nodes. The available nodes list may include the nodes in the newest route table 230 of sensor 100 that can perform direct communication (i.e. one-hop), such as nodes 3-7. Of course, the available nodes list may also include the nodes in the new route table 220 (route table 220 becomes route table 230 after it is updated) of sensor 100 that can perform direct communication, such as nodes 1-5. The available nodes list may also include nodes 8 and 9, and sensor 100 receives message only from nodes 8 and 9. In this embodiment, the "ALAN" includes nodes 1-9.

Another ALAN creating method is that sensor 100 sends particular message to all nodes reachable by further communicating, requesting these nodes to reply to determine their availability. These nodes may include inactive nodes, existing as backup nodes. The backup nodes are activated by the particular message to participate in the following discussion organized by the agent node. The discussion mode may be any one of the existing modes.

Of course, if the sensors are relatively densely distributed within an area, the available nodes may also include those nodes which can perform multi-hop communication with sensor 100.

The process for determining the agent node as follows: firstly, the sensor 100 sends request M1 to a node (RN) of the adjacent nodes (NN). Secondly, the node RN estimates the quantity of electricity needed to perform the searching backup node according to the available nodes list within the request M1 (ALAN). Thirdly, if the quantity of electricity of node RN is larger than the sum quantity of electricity and a particular threshold value, the node RN sends a confirmation message M2 to the sensor 100 to indicate that the node (RN) becomes an agent node (AN), otherwise, the RN sends a re-selecting message M3 to the sensor 100 for requesting sensor 100 to select another node among its adjacent nodes as its agent node. The sensor 100 can repeat the process until an agent node is found among adjacent nodes of the sensor 100. In this embodiment, node 2 is selected as the agent node for the sensor 100.

The confirmation message M2 sent by node RN may be in the format as follows.

| Message type | sender | Receiver | Content |
|---|---|---|---|
| M2 | RN | Sensor 100 | Confirmation: AN |

The re-selecting message M3 sent by node RN may be in the format as follows.

| Message type | Sender | Receiver | Content |
|---|---|---|---|
| M3 | RN | Sensor 100 | Re-selecting AN |

After node 2 is selected as an agent node of sensor 100, a discussion is organized in all the available nodes according to the ALAN list for selecting a suitable backup node. The discussion mode may be any one of the existing modes of discussion. The basic principle is to consider whether the function, capability and quantity of electricity of the available node of the candidate backup nodes can replace sensor 100. At the beginning of the discussion, node 2 may send a message M4 to node 1 and nodes 3-9 to inform them the function and capability of sensor 100. During the whole discussion, avoid the sensor 100 if multi-hop communication is needed among the nodes participating in the discussion.

Message M4 sent by node AN may be in the format as follows:

| Message type | Sender | Receiver | Content | |
|---|---|---|---|---|
| M4 | AN | ALAN | Function of sensor 100 | Capability of sensor 100 |

After discussion, node 4 is determined as the backup node (BN)) of sensor 100. Of course, the result of the discussion may also determining of any other available qualified node (including node 2) as the backup node of sensor 100.

Then, node 4 sends a message M5 to sensor 100 for requesting the function and/or data of sensor 100, e.g. temperature inducing function of sensor 100.

Message M5 sent by backup node (BN, node 4) may be in the format as follows:

| Message type | Sender | Receiver | Content |
|---|---|---|---|
| M5 | BN | Sensor 100 | Requesting backup data/function |

Upon receiving message M5 sent from node 4, sensor 100 sends the data and/or function to the node 4 to be backed up, and puts itself in a power-saving state. The sending process may also be done in two steps. In the first step, the general data and/or function are transferred to backup node (BN, node 4), and when the quantity of electricity of sensor 100 further drops to a lower lever, the key data and/or function are transferred to the backup node (BN, node 4).

After the backup, sensor 100 no longer induces the temperature variation, and node 4 performs sensor 100's temperature inducing instead.

Finally, agent node (AN, node 2) or backup node (BN, node 4) may also send a notice message M6 to the nodes (e.g. available nodes ALAN) that has communicated with sensor 100, informing it that sensor 100 is in a power-saving state and that its function and/or data are processed by the backup node (BN, node 4), so that it could adopt corresponding measures, such as one for updating their route table.

Message M6 sent by agent node (AN, node 2) may be in the format as follows:

| Message type | Sender | Receiver | Content |
|---|---|---|---|
| M6 | AN | ALAN | Sensor 100 has been backed up by BN (node 4) |

If the sensor network has a control center, the agent node (AN, node 2) or backup node (BN, node 4) may also send a notice message M7 to the control center for informing the control center that sensor 100 is in a power-saving state and that its function and/or data are to be processed by the backup node (BN, node 4).

Message M7 sent by agent node (AN, node 2) may be in the format as follows:

| Message type | Sender | Receiver | Content |
|---|---|---|---|
| M7 | AN | Control center | Sensor 100 has been backed up by BN (node 4) |

In a sensor network, various nodes may be of different level of importance. By virtue of the present invention, the nodes of minor importance may seek a backup node for a node of importance, so as to reduce the communication burden of the node of importance and prolong their life of performance. Of course, every node may be selected to be as a backup node by an adjacent node according to given principles.

The present invention has been described above in combination with the embodiments. It is evident that those skilled in the art can obviously make all sorts of substitutions, modifications and changes on the basis of what has been described above. For that matter, all substitutions, modifications and changes of the nature should be in the spirit, and fall within the scope, of the claims of the present invention.

The invention claimed is:

1. A method for finding a backup node for a node in a sensor network, the method comprising the steps of:
   a. detecting, via the node itself, that the node is in a state of waiting to be backed up; and
   b. determining, via the node to be backed up, in response to detecting that the node is in the state of waiting to be backed up, an agent node from a plurality of nodes adjacent to the node to be backed up, wherein determining includes sending a request that the agent node find the backup node on behalf of the node to be backed up from a list of available backup nodes communicated directly in the request to the agent node from the node to be backed up, wherein (i) the agent node initially functions as a receiver node RN of the adjacent nodes, (ii) the receiver node estimates a quantity of electricity needed to perform the searching for a backup node according to the list of available backup nodes within the request, and (iii) if the quantity of electricity of the receiver node RN is larger than a sum quantity of (iii)(a) electricity needed to perform the searching for the backup node and (iii)(b) a particular threshold value, then (iv)(a) the receiver node RN sends a confirmation message to the node to be backed up to indicate that the receiver node RN becomes the agent node (AN), otherwise, (iv)(b) the receiver node RN sends a re-selecting message to the node to be backed up, wherein the re-selecting message directs the determining step, via the node to be backed up, to select another node among its adjacent nodes as its agent node, and wherein said determining step repeats the determining of another node as an agent node and the sending of the request that the another node find a backup node for the node to be backed up until an agent node is found.

2. The method according to claim 1, further comprising the step of:
transmitting data of the node to be backed up to the backup node.

3. The method according to claim 1, further comprising the step of:
performing, via the backup node, at least a part of corresponding functions of the node to be backed up.

4. The method according to claim 1, wherein the state to be backed up is that a quantity of electricity of the node to be backed up is lower than a pre-set value.

5. The method according to claim 1, wherein the adjacent nodes comprises nodes of the sensor network with which the node to be backed up may directly communicate.

6. The method according to claim 1, wherein the agent node is an adjacent node with which the node to be backed up has recently communicated.

7. The method according to claim 1, wherein the backup node is similar to the node to be backed up in processing capabilities.

8. The method according to claim 7, wherein the processing capabilities comprise at least one of the following capabilities: inducing, storing, transmitting, replaying, accepting request, event triggering, and data processing.

9. A sensor, which is one of a plurality of nodes within a sensor network, comprising:
a detecting component of the sensor that detects, via the sensor itself, whether the sensor is in a state of waiting for being backed up via a backup node; and
a determining component of the sensor that determines, in response to the detecting component detecting that the sensor is in a state of waiting to be backed up, an agent node from among a plurality of nodes adjacent the sensor, wherein the determining component sends a request that the agent node seek the backup node on behalf of the sensor from a list of available backup nodes communicated directly in the request to the agent node from the sensor, wherein (i) the agent node initially functions as a receiver node RN of the adjacent nodes, (ii) the receiver node estimates a quantity of electricity needed to perform the searching for a backup node according to the list of available backup nodes within the request, and (iii) if the quantity of electricity of the receiver node RN is larger than a sum quantity of (iii)(a) electricity needed to perform the searching for the backup node and (iii)(b) a particular threshold value, then (iv)(a) the receiver node RN sends a confirmation message to the sensor to indicate that the receiver node RN becomes the agent node (AN), otherwise, (iv)(b) the receiver node RN sends a re-selecting message to the sensor, wherein the re-selecting message directs the determining component of the sensor to select another node among its adjacent nodes as its agent node, and wherein the determining component repeats the determining of another node as an agent node and the sending of the request that the another node find a backup node for the sensor until an agent node is found.

10. A sensor network, comprising a plurality of nodes including a first sensor and a second sensor,
wherein the first sensor comprises:
a detecting component of the first sensor that detects, via the first sensor itself, whether the first sensor is in a state to be backed up via a backup node; and
a determining component of the first sensor that determines, in response to the detecting component detecting that the first sensor is in a state of waiting for being backed up, the second sensor as an agent node from among a plurality of nodes adjacent the first sensor, wherein the determining component sends a request that the second sensor find a backup node on behalf of the first sensor from a list of available backup nodes communicated directly in the request to the second sensor from the first sensor, and
wherein the second sensor comprises:
a communicating component of the second sensor that finds a backup node for the first sensor according to the request from the first sensor, wherein the second sensor agent node seeks the backup node from a list of available backup nodes communicated directly in the request to the second sensor agent node from the first sensor, wherein (i) the second sensor agent node initially functions as a receiver node RN of the adjacent nodes, (ii) the receiver node estimates a quantity of electricity needed to perform the searching for a backup node according to the list of available backup nodes within the request, and (iii) if the quantity of electricity of the receiver node RN is larger than a sum quantity of (iii)(a) electricity and (iii)(b) a particular threshold value, then (iv)(a) the receiver node RN sends a confirmation message to the first sensor to indicate that the receiver node RN becomes the second sensor agent node (AN), otherwise, (iv)(b) the receiver node RN sends a re-selecting message to the first sensor, wherein the re-selecting message directs the determining component of the first sensor to select another node among its adjacent nodes as its second sensor agent node, and wherein the determining component repeats the determining of another node as an agent node and the sending of the request that the another node find a backup node for the first sensor until a second sensor agent node is found.

11. The sensor network according to claim 10, wherein the detecting component further detects a quantity of electricity of the first sensor, and the state of waiting for being backed up is that the quantity of electricity is lower than a pre-set value.

* * * * *